June 19, 1945. C. L. HOOKER, JR., ET AL 2,378,632
APPARATUS FOR SEPARATING SOLIDS FROM LIQUIDS
Filed July 27, 1942 3 Sheets-Sheet 1
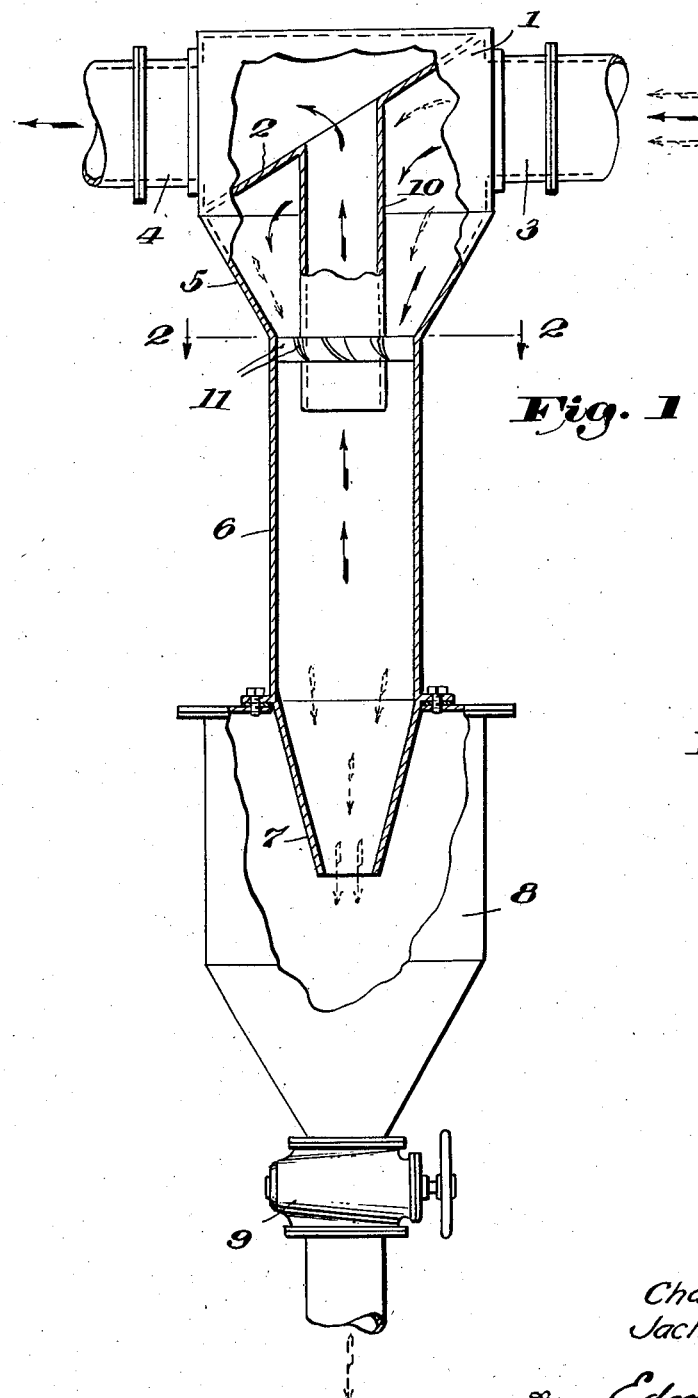
Inventors
Charles L. Hooker, Jr.
Jackson W. Staley,
By Edmund H. Parish
Attorney

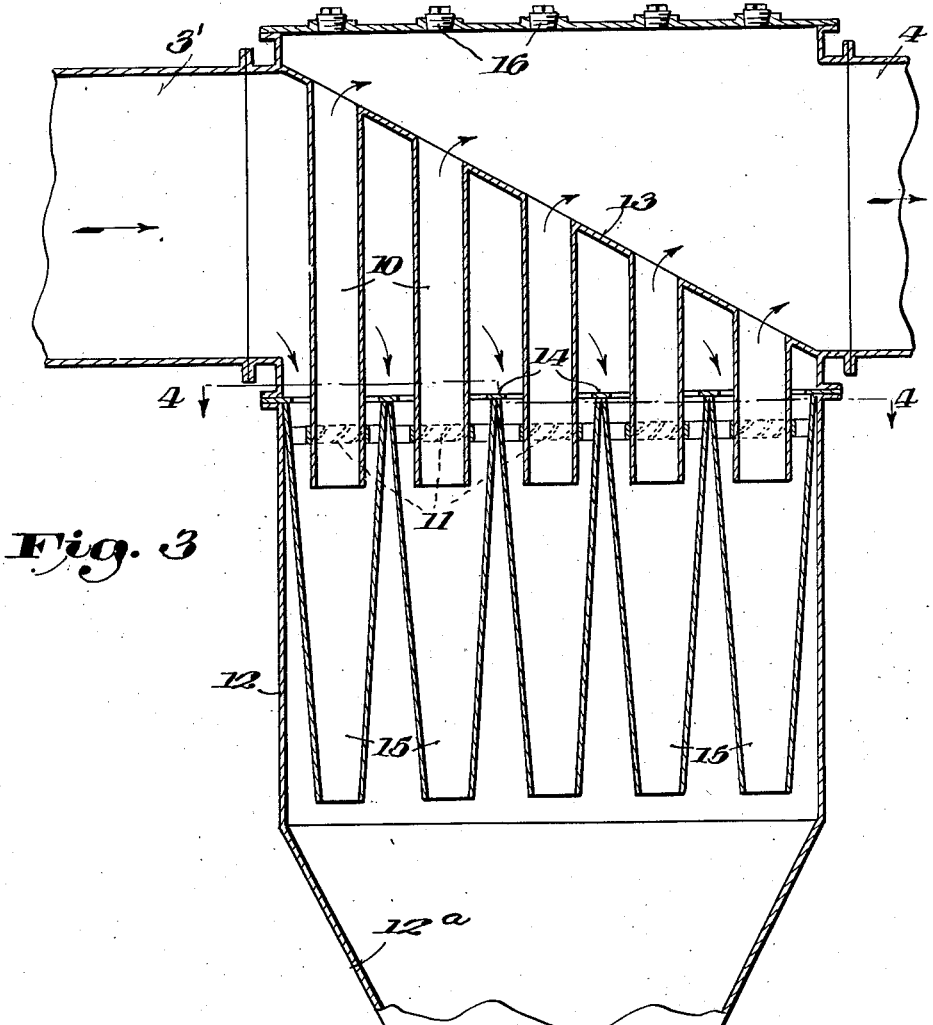
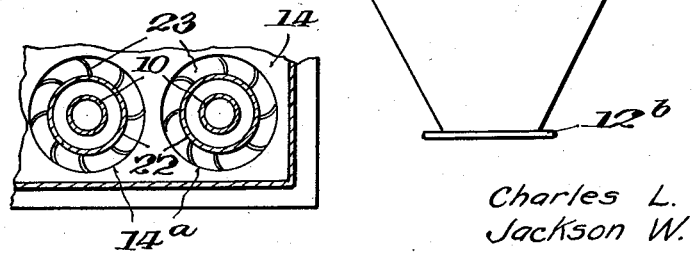

Patented June 19, 1945

2,378,632

UNITED STATES PATENT OFFICE 2,378,632

APPARATUS FOR SEPARATING SOLIDS FROM LIQUIDS

Charles L. Hooker, Jr., and Jackson W. Staley, Brewster, Fla.; said Staley assignor to said Hooker, Jr.

Application July 27, 1942, Serial No. 452,550

8 Claims. (Cl. 210—57)

This invention relates to the separation from a liquid of particles of solid matter suspended therein.

The primary object of the invention is to provide simple and efficient means for effecting such a separation solely by the centrifugal action of a whirling column of the liquid mixture, and without the use of any rotating or mechanically moving parts.

A further object is to devise improved means for imparting a whirling motion to the liquid column, so constructed that any desired number of separating units may be assembled and caused to operate in parallel, whereby the capacity of such apparatus may be indefinitely increased.

A still further object of the invention is to devise, in connection with such a multiple unit system means whereby the velocity of flow through each unit may be maintained constant at all times, so that the separating action is kept uniform.

With the above and other objects in view, as will later appear, the invention consists in the construction and arrangement of parts hereinafter described and claimed, and illustrated in the accompanying drawings, in which:

Fig. 1 is a vertical section through a single separator unit operating in accordance with the invention, parts being broken away;

Fig. 2 is a transverse section on an enlarged scale, substantially on the line 2—2 of Fig. 1, looking in the direction of the arrows;

Fig. 3 is a vertical central section through an assembly comprising a plurality of improved separator units, arranged to operate in parallel;

Fig. 6 is a fragmentary horizontal section, substantially on the line 6—6 of Fig. 5, looking in the direction of the arrows.

Figure 4:
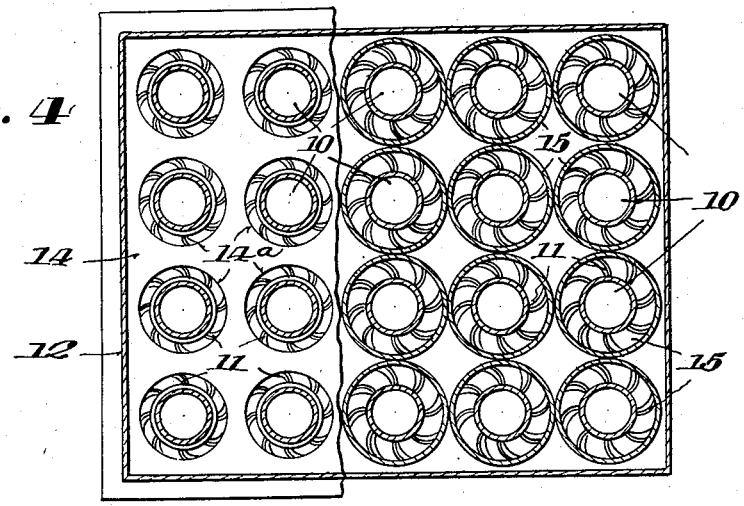
Fig. 4 is a sectional view, substantially on the line 4—4 of Fig. 3, looking in the direction of the arrows.

Referring to the drawings in detail and more particularly first to Fig. 1, we have therein illustrated one of our improved separating units. It consists of a casing 1 having a partition 2 extending diagonally thereacross, dividing it into an inlet compartment and an outlet compartment. Inlet and outlet connections 3 and 4 communicate respectively with said compartments.

Depending from the bottom of the casing 1 is a separating chamber comprising an upper conical portion 5, an intermediate cylindrical portion or conduit 6 and a lower conical portion 7. The latter extends into and is surrounded by a hopper or receptacle 8, preferably having a conical lower portion, and provided at its lower end 9 with a suitable rotary valve or the like by which the same is normally closed.

Opening through the partition 2, and thus communicating with the outlet compartment, is a vertical tube 10, the lower end of which extends down into the cylindrical portion 6 of the conduit or separating chamber. The tube 10 is disposed concentrically with the conduit 6 and is of smaller diameter, so that an annular space is provided between the same. Located within this annular space are a series of radial curved blades or vanes 11 of such shape as to impart a whirling motion to liquid passing downwardly through the same.

The liquid mixture to be separated is fed under pressure to the inlet connection 3 and flows thence downwardly through the annular space between the tube 10 and conduit 6, and through the vane structure 11. The vanes impart to the liquid a whirling motion, so that any particles of solid matter carried by the liquid are thrown by centrifugal force outwardly toward the walls of the conduit 6 and settle downwardly by gravity to the lower end of this conduit, where they are discharged into the receptacle 8 and collect therein. Since the escape of liquid from the lower end of the apparatus is prevented by reason of the fact that the discharge opening 9 is normally closed, the entire apparatus is filled with liquid and hence the liquid flowing down through the vanes 11 must pass upwardly through the tube 10 to the outlet compartment and escape from the outlet 4. Thus the liquid passes continuously up the tube 10 and out of the outlet, while the solid matter is thrown toward the walls of the conduit 6 and passes by gravity downwardly therealong, and collects in the receptacle 8. It may be discharged from the lower end of this receptacle from time to time as required.

Referring now to Figs. 3 and 4, we have illustrated apparatus in which a plurality of our improved separating units are assembled in a single casing and arranged to operate in parallel. In these figures the casing is designated in its entirety by the reference numeral 12, and is provided with a lower portion 12ª terminating at the bottom in a discharge opening 12ᵇ. The casing is provided near the top with inlet and outlet connections 3' and 4', respectively.

Extended diagonally across the upper portion of the casing is a tube sheet 13, thus forming inlet and outlet compartments communicating with the inlet and outlet connections respectively.

Set into the tube sheet 13, with their ends opening therethrough, are a plurality of tubes 10, communicating with the outlet compartment. These tubes extend vertically downward through openings 14a in a supporting sheet 14 extending horizontally across the casing. Depending from this supporting sheet are a plurality of separating chambers or conduits 15, shown as of frustoconical shape. Each tube 10 projects down into the upper end of one of these conduits 15 and, being smaller in diameter, is spaced radially from the conduit, thus forming between itself and the conduit an annular passage. Disposed within this passage is an annular series of curved blades or vanes 11, similar to those previously described, such blades or vanes serving to impart a whirling motion to liquid flowing down through the annular passageway. It will be understood that the openings in the sheet 14 through which the tubes 10 extend are substantially larger than the tubes, so that an annular passageway is provided around each tube for the flow of liquid. Clean out openings, closed by plugs 16, are preferably provided in the casing cover placed immediately above each of the tubes 10.

It will be noted that the sloping or diagonal tube sheet 13 which extends across the casing forms an inlet compartment which progressively decreases in size as the distance from the inlet increases. This compensates for the loss in pressure as the liquid enters the upper ends of the conduits 15 and assures that the pressure applied to the mouths of all of these conduits is equalized.

Figure 5:
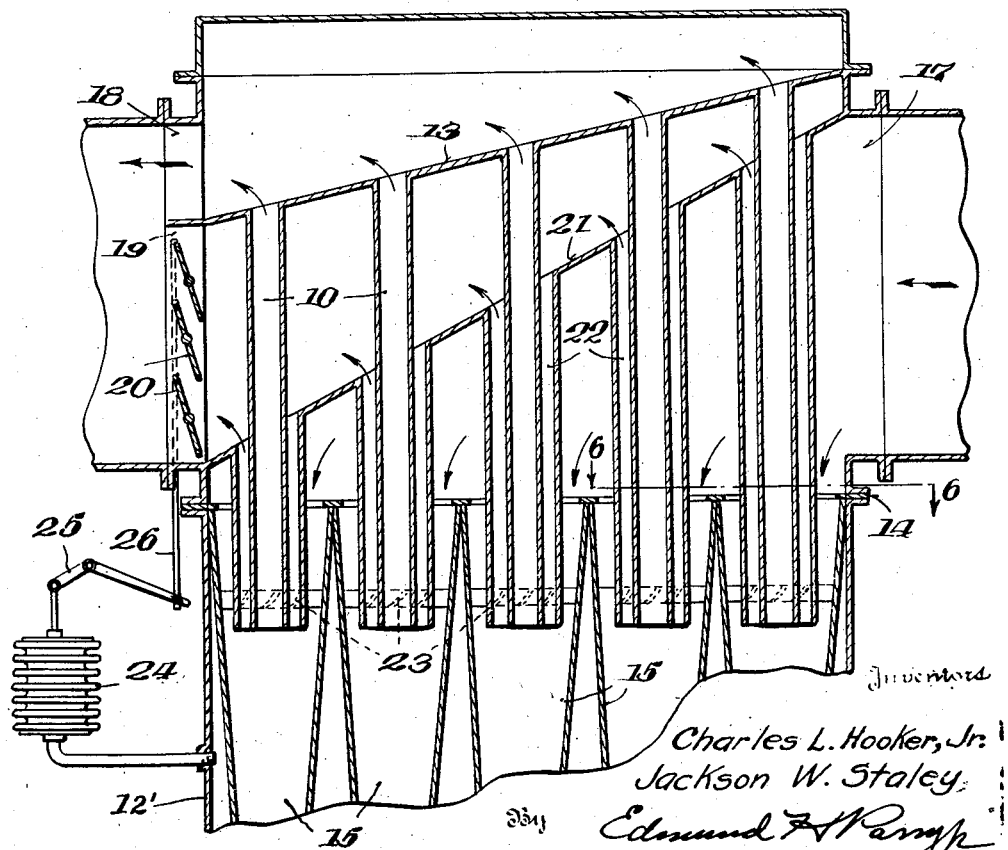
Fig. 5 is a vertical section, similar to Fig. 3, but showing the improved means for maintaining the velocity of flow through all of the units constant and uniform.

In practice, it frequently happens that the pressure under which the liquid mixtures to be separated are fed into the inlet opening, especially if supplied over a long pipe line, varies widely, due to surging, or other causes. As the velocity with which such mixtures flow through the vanes into the separating chambers is a function of the pressure existing in the casing, and as it is desirable to employ a velocity which varies as little as possible, in order to secure a uniform separating operation, it is important to maintain the pressure in the casing substantially constant. Means for accomplishing this are illustrated in Figs. 5 and 6.

These figures show an assembly of a plurality of separating units very similar to that illustrated in Figs. 3 and 4, but, in addition to the tube sheet 13 and tubes 10, we provide a second tube sheet 21, spaced from the first, and disposed at a different angle. Thus the casing 12' is divided into an inlet compartment communicating with the inlet connection 17, and two outlet compartments, both communicating with the outlet connection, but each communicating separately with a different part thereof. Thus the upper outlet compartment, into which the tubes 10 open, communicates with a constantly open portion 18 of the outlet, while the other outlet compartment communicates with a portion 19 of the outlet the flow through which is controlled by suitable valve means, shown as consisting of a series of shutters or dampers 20.

A second set of outlet tubes 22 open through the tube sheet 21 into the outlet compartment which communicates with the damper controlled portion of the outlet, and each of these tubes surrounds and is spaced from the corresponding one of the tubes 10. Each pair of tubes projects concentrically into one of the separating chambers or conduits 15, and a vane structure 23, similar to the vanes 11 previously described, and for the same purpose, is mounted in the annular space between each tube 22 and the corresponding conduit 15.

Thus, liquid entering the apparatus will flow out partially through tubes 10 and the portion 18 of the outlet, and partially through the tubes 22 and the portion 19 of the outlet.

It is obvious that the pressure which exists, at any moment, within the casing depends, within limits, on the ratio between the areas of the inlet and outlet openings. Thus, if the outlet should be completely closed, the pressure within all parts of the casing would be equal to that existing at the inlet. If, on the other hand, an outlet passage is provided having an area fully equal to that of the inlet, the presure within the casing would be small, and only sufficient to overcome the frictional resistance to flow. By opening or closing the dampers 20, the ratio between the effective areas of the inlet and outlet openings is altered, and the pressure within the casing varied accordingly.

These dampers may be adjusted by hand, so as to give any desired pressure, or they may be moved automatically, so as to maintain the pressure substantially constant. For the latter purpose, any desired and well known pressure-responsive regulating means, such as a Sylphon bellows 24, operated by the pressure of liquid within the casing, and connected with the dampers, as by means of a lever 25 and link 26, may be employed. If the pressure tends to fall, the regulating device would move the dampers toward closed position, thus causing the pressure within the casing to build up, and vice versa.

What we claim is:

1. Means for separating solids from liquid mixtures containing the same, said means comprising a casing, a partition extending diagonally across the casing and dividing the same into a lower inlet compartment and an outlet compartment, a conduit communicating with and depending from the lower portion of said inlet compartment, a tube communicating with said outlet compartment depending from said partition and projecting into said conduit, said tube being disposed concentrically with said conduit, and means within the annular space between said tube and conduit for imparting a whirling motion to liquid mixtures flowing down through said space from said inlet compartment into said conduit, whereby solid particles contained in said liquid mixtures are thrown outwardly toward the walls of said conduit.

2. Means for separating solids from liquid mixtures containing the same, said means comprising a casing, aligned inlet and outlet ports disposed in opposite side wall portions of the casing, a partition extending diagonally of the casing from a point above the inlet port to a point below the outlet port and dividing said casing into a lower inlet compartment and an upper outlet compartment, a conduit depending from said inlet compartment, a tube depending from said partition and projecting into said conduit, said tube being disposed concentrically with said conduit, whereby liquid entering said inlet compartment is caused to flow first downwardly through the annular space between said tube and conduit, and thence upwardly through said tube to said outlet compartment, and means for imparting a whirling motion to the liquid passing down through said annular space, whereby any solid particles carried by said liquid are thrown outwardly toward the walls of said conduit.

3. Apparatus for separating solids from liquid mixtures containing the same, said apparatus comprising a casing, a tube sheet extending diagonally across said casing and dividing the same into inlet and outlet compartments, said compartments having inlet and outlet openings, respectively, a series of tubes having their upper ends set into said tube sheet and communicating with said outlet compartment, said tubes depending from said sheet and being of a length which decreases progressively as their distance from said inlet opening increases, a series of conduits each embracing the lower end of one of said tubes and spaced therefrom, said conduits extending below said tubes and communicating with said inlet compartment, and means for imparting a whirling motion to the liquid entering the upper ends of said conduits from said inlet compartment.

4. Apparatus for separating solids from liquid mixtures containing the same, said apparatus comprising a casing, a tube sheet extending diagonally across said casing and dividing the same into inlet and outlet compartments, said compartments having inlet and outlet openings, respectively, said inlet compartment decreasing in size in a direction away from said inlet opening, a series of vertical tubes supported by the tube sheet and communicating at their upper ends with said outlet compartment, a series of conduits, each embracing the lower end of one of said tubes and extending below the same, said conduits being spaced radially from said tubes and communicating at their upper ends with the lower portion of said inlet compartment, means for supplying a liquid mixture under pressure into said inlet opening, and means for imparting a whirling motion to the liquid mixture passing down into the upper ends of said conduits.

5. Apparatus for separating solids from liquid mixtures containing the same comprising a casing having opposite inlet and outlet connections and provided with two spaced partitions extending from above the inlet downwardly diagonally across the casing and dividing the same into a lower inlet compartment and an upper pair of outlet compartments, at least one separating device including a separating chamber communicating with said inlet compartment and a pair of outlet tubes extending from said separating chamber upwardly through the inlet compartment, one into each of said outlet compartments, respectively, a part of said outlet connection communicating with one of said outlet compartments and being constantly open, and the remaining part of said outlet connection communicating with the other of said outlet compartments, and means for controlling the flow of liquid through the last mentioned part of said outlet connection.

6. A centrifugal separator comprising a casing, a lower inlet compartment and an upper outlet compartment in the casing, a downwardly inclined partition extending across the casing and forming the upper wall of the inlet compartment, a side inlet opening in the casing facing the partition and opening into the inlet compartment, a separating chamber depending from the casing, an outlet tube opening into the outlet compartment depending from the inclined partition and extending downwardly through the inlet compartment into the upper section of the separating chamber to form therein an annular passage providing communication between the inlet compartment and the section of the separating chamber below the lower end of the outlet tube, and means in said annular passage for imparting a whirling motion to fluid flowing therethrough.

7. A centrifugal separator according to claim 6 wherein a downwardly tapering conduit section interconnects the lower end of the casing and the separating chamber.

8. A centrifugal separator comprising a casing, an inlet opening in the side of the casing, a partition extending from a point above the inlet opening across the casing and being inclined downwardly to form an inlet compartment of progressively decreasing cross-section in a horizontal direction away from the inlet, an outlet compartment in the casing above the partition, a plurality of vertical cylindrical separating chambers below the casing arranged one after another at different horizontal distances from the inlet opening and communicating with portions of the inlet compartment of different cross-section, an outlet compartment in the casing above the inclined partition, outlet tubes communicating with the outlet compartment extending downwardly through the inlet compartment and into the upper sections of the respective separating chambers to form therein annular passages, and means in said respective annular passages for imparting whirling motion to fluid being delivered to the respective separating chambers.

CHARLES L. HOOKER, Jr.
JACKSON W. STALEY.